United States Patent
Harkins, Sr.

(10) Patent No.: US 6,660,205 B1
(45) Date of Patent: Dec. 9, 2003

(54) FABRIC COVERED SHOE WELT

(75) Inventor: Daniel C. Harkins, Sr., Brockton, MA (US)

(73) Assignee: Rextrude Co., Brockton, MA (US)

( * ) Notice: Subject to any disclaimer, the term of this patent is extended or adjusted under 35 U.S.C. 154(b) by 622 days.

(21) Appl. No.: 09/613,543

(22) Filed: May 31, 2000

Related U.S. Application Data

(62) Division of application No. 09/105,512, filed on Jun. 26, 1998, now abandoned.

(51) Int. Cl.⁷ .............................................. B29D 31/50
(52) U.S. Cl. ........................ 264/244; 36/17 R; 36/78; 12/4.4
(58) Field of Search .................. 264/244; 36/17 R, 36/17 PW, 17 A, 78; 12/4.4, 67 K

(56) References Cited

U.S. PATENT DOCUMENTS

| | | | |
|---|---|---|---|
| 2,363,456 A | * 11/1944 | Wright | |
| 2,412,429 A | * 12/1946 | Slingluff et al. | |
| 3,103,024 A | 9/1963 | Greene | |
| 3,232,820 A | 2/1966 | Churchill | |
| 3,652,757 A | * 3/1972 | Wessel et al. | |
| 3,758,903 A | * 9/1973 | Auberry et al. | |
| 3,823,493 A | 7/1974 | Brehm et al. | 36/2.5 R |
| 3,846,920 A | 11/1974 | Perry et al. | 36/22 |
| 4,523,346 A | * 6/1985 | Auberry et al. | |
| 4,960,374 A | 10/1990 | Pröll | 425/119 |
| 5,032,330 A | * 7/1991 | Auberry et al. | |
| 5,195,255 A | * 3/1993 | Caughlin | |
| 5,285,546 A | * 2/1994 | Haimerl | 12/142 E |
| 5,732,479 A | 3/1998 | Pavelescu | 36/12 |
| 5,785,909 A | * 7/1998 | Chang et al. | |

* cited by examiner

*Primary Examiner*—Michael Colaianni
*Assistant Examiner*—Geoffrey P. Shipsides
(74) *Attorney, Agent, or Firm*—Choate, Hall & Stewart

(57) ABSTRACT

A fabric-covered shoe welt, and methods of making such a welt and using it to make shoes. The welt is an extruded polymer, and has fabric attached to at least one surface. The fabric is then bonded to the sole of the shoe. The fabric is selected to adhere well to both welt and sole, usually by allowing liquid to wick into the fabric before solidification.

7 Claims, 5 Drawing Sheets

FABRIC COVERED SHOE WELT

CROSS REFERENCE TO RELATED APPLICATION

This Application is a Divisional of U.S. patent application Ser. No. 09/105,512. Filed Jun. 26, 1998 which is incorporated herein by reference, now abandoned.

FIELD OF THE INVENTION

The invention relates to a welt for shoes having at least one fabric-coated side, and methods for making such a welt. The invention further relates to methods of manufacturing shoes using fabric-coated welts.

BACKGROUND OF THE INVENTION

Traditionally, a leather welt has been stitched to a shoe upper, which was in turn attached to the shoe sole, for comfort and longevity of the shoe. Modern welts are frequently made of synthetic materials, although it is often desirable to preserve a leather-like appearance.

The separate welt is most commonly in the form of a vinyl (or other plastic) strip, which is stitched to the upper, and is cemented and/or stitched to the midsole and/or sole. The cement is usually applied in the form of a viscous liquid to the surface of the welt, which is then placed in contact with the midsole and/or sole to form a bond. A difficulty arises when cementing the plastic welt to certain types of midsoles and soles, in that it is difficult to achieve a high-stength bond between the welt and the midsole and/or sole. Furthermore, the liquid cement may be messy and difficult to apply without marring the surface of the shoe.

Another common shoe construction uses the "blow sole" method. In this method, the welt is stitched to the upper of the shoe, and the welt and upper are clamped in a mold. A liquid polymer precursor such as urethane is then mixed with a catalyst and poured into another mold in the shape of a shoe sole, and the two molds are clamped together. Heat is generated by the interaction of the catalyst and the precursor to expand the polyurethane of the sole to "blow" the liquid into contact with the welt, bonding welt and sole together and curing the sole.

Unfortunately, the blow sole method of shoe construction has been found to produce an inadequate bond between the sole and welt of the shoe for prior art welts. It is an object of the present invention to provide a welt which can be used in either a blow sole or a traditional shoe compaction to produce a shoe which does not separate during normal use.

SUMMARY OF THE INVENTION

In one aspect, the invention comprises a composite welt to be used in the manufacture of shoes. The welt comprises a layer of fabric bonded to at least one surface of the welt which will be placed in contact with the sole of the shoe. The welt may comprise materials such as poly(vinyl chloride) (PVC), thermoplastic rubber, chlorinated polyethylene (CPA) or ethyl vinyl acetate (EVA). The fabric may be a polyester stitchbond, for example a six-ounce stitchbond.

In another aspect, the invention comprises a method for making shoe welts, in which a welt is extruded, and a strip of fabric is attached to a surface of the welt intended to be placed in contact with the sole of the shoe. The extruded welt may comprise a coextruded adhesive layer, which is used to attach the fabric to the welt. The fabric may be a polyester stitchbond, for example a six-ounce stitchbond.

In yet another aspect, the invention comprises a method for making shoes. The method comprises providing a polymer welt having a layer of fabric bonded to a surface of the welt, attaching the welt to an upper of a shoe, providing a mold for a shoe sole, filling the mold with a liquid sole precursor composition, placing the mold in contact with the welt, inducing the precursor to penetrate the fabric layer, and solidifying the precursor to form a solid sole attached to the welt. The welt may comprise materials such as PVC, thermoplastic rubber, CPE, or EVA. The fabric may be a polyester stitchbond, for example a six-ounce sntchbond, and may be attached to the welt, for example, by a coextruded adhesive layer. The welt may be stitched or glued to the upper. The sole may comprise polyurethane. Inducing the precursor to penetrate the fabric layer may include inducing a chemical reaction in the precursor, for example via a catalyst added to the precursor.

In still another aspect, the invention comprises a method for making shoes. The method comprises providing a polymer welt having a fabric layer bonded to a surface thereof, attaching the welt to an upper, and attaching a sole to the fabric layer. The sole may be attached to the fabric by an adhesive such as neoprene cement, urethane cement, or alpha-poly-alpha-ol efin (APAO), and may itself comprise materials such as, for example, neoprene, EVA, leather, leather board, stitchbond boards, or urethanes.

BRIEF DESCRIPTION OF THE DRAWING

The invention is described with reference to the several figures of the drawing, in which.

DETAILED DESCRIPTION

The fabric-covered welt of the invention may be produced by a process somewhat similar to that of the inventor's previous patent application, U.S. Ser. No. 09/016,367, incorporated herein by reference. That application describes a method of coextrudin a thermoplastic polymer onto the surface of a shoe welt, so that the welt can be attached to the midsole or sole simply by preheating it above the softening temperature of the thermoplastic and pressing the welt into place, producing a bond. The thermoplastic polymer serves as a "solid cement."

A preferred embodiment of the fabric-covered welt of the present invention is also produced by first producing an extruded shoe welt. The welt has a thermoplastic material with a relatively low softening temperature at the surface where the fabric is to be applied. The thermoplastic material may be applied, for example, by either coextrusion or secondary extrusion. In some embodiments of the invention, the fabric is applied to the surface of the welt as it emerges from the extruder. In these embodiments, the thermoplastic layer is hot enough as it exits the extruder that it bonds the fabric in place. In other embodiments, the welt is preheated to activate the solid cement, and the fabric is pressed against the welt and cooled, as described in U.S. Ser. No. 09/016, 367. The fabric may also be attached to the welt by conventional adhesives. In all of these embodiments, the fabric is chosen to have the characteristic of forming a strong bond with the welt. The warp, weave, and finish of the fabric used may be chosen to allow soft or liquid adhesives to wick into the fabric to form a strong bond, for example. Non-woven "polyester stitchbond" (often actually a blend of polyester and cotton), particularly in two-ounce and six-ounce weights, has been found to form a good bond with certain polyurethane blown soles, for example.

Figure 1:
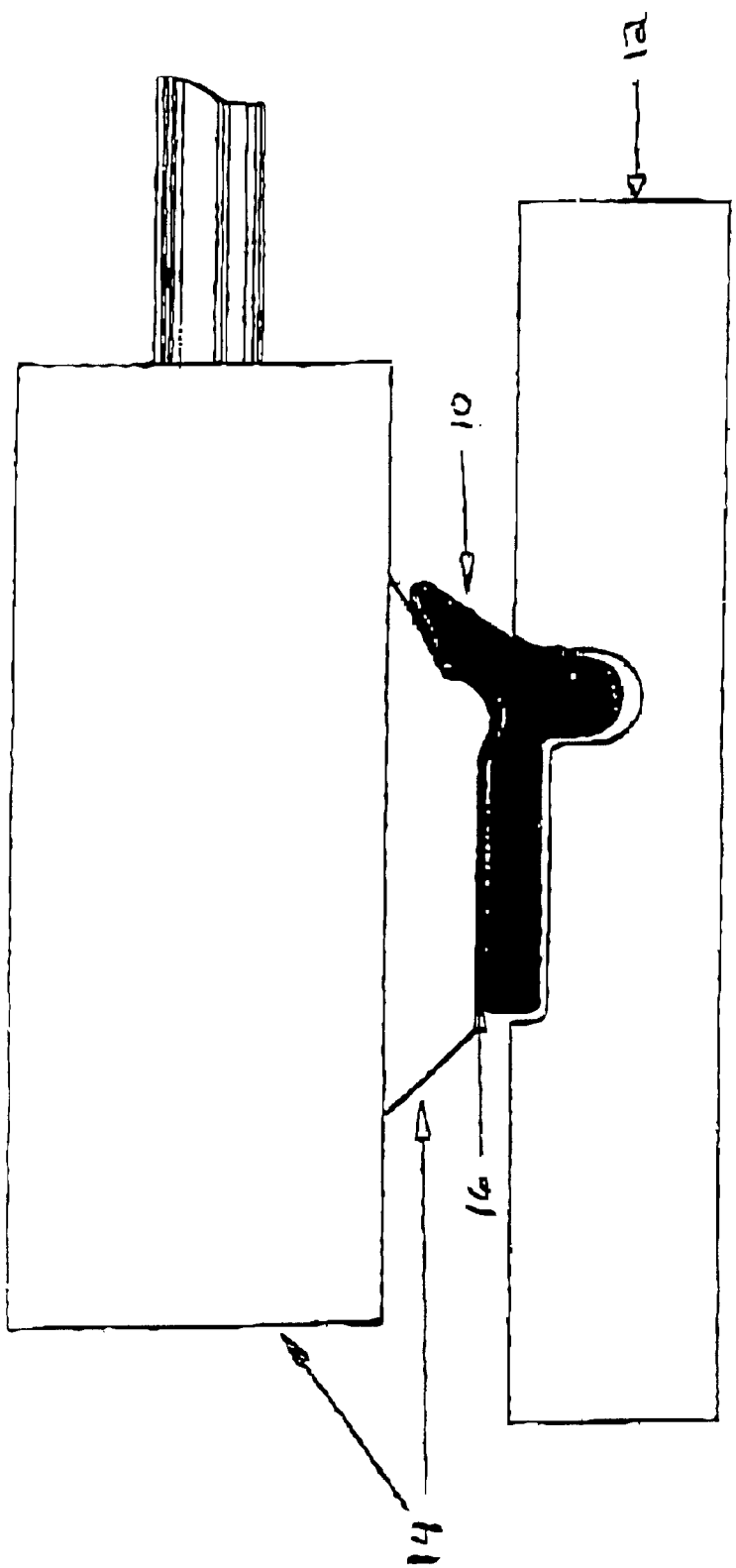
FIG. 1 illustrates the application of an adhesive layer to a welt.
Figure 2:
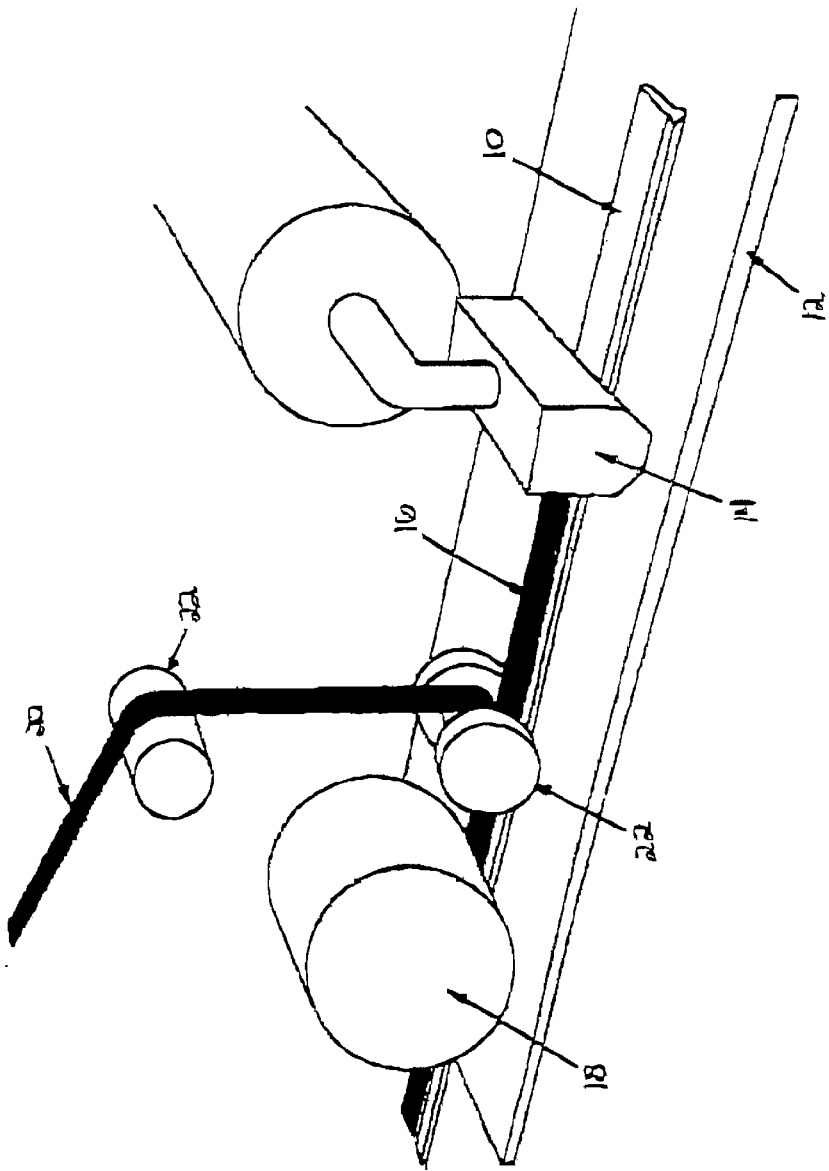
FIG. 2 is a schematic of an apparatus for attaching fabric to a welt.

FIG. 1 illustrates one embodiment the process of simultaneously coextruding a thermoplastic urethane layer onto a PVC welt. Welt 10 is held in guide 12, and is passed under shaped nozzle 14, which dispenses liquid urethane 16 onto the welt surface. Referring to FIG. 2, the welt 10 then passes into a set of shaped rollers 18 for application of the fabric strip 20. In the embodiment shown, the strip passes over guide rolls 22, and then is pressed against the cooling urethane layer 16 to bond the fabric 20 to the welt 10. Skilled artisans will recognize that the thickness of the urethane layer 16 and the speed of travel of the welt 10 should be chosen to ensure that the urethane layer has not completely solidified at the point where the fabric 20 is applied. Welts have been produced by this process having peel strengths of 25–40 lbs/in for a ⅝ " fabric strip.

Once the fabric-coated welt has been produced, it can be attached to the shoe sole either by liquid or solid adhesive, or by blow molding. In liquid-adhesive embodiments, it is desirable that the fabric of the welt absorb the adhesive at least somewhat, providing a strong bond with the midsole and/or sole. In solid-adhesive embodiments, the edge of the sole of the shoe is coated with a solid adhesive, which can be activated by heat, solvents, or other means. The welt and the sole are pressed together and subjected to activating conditions, allowing the adhesive to flow into the fabric of the well, forming a strong bond.

A preferred method of attachment for the welts of the invention is blow molding. The basic blow molding process has been described above, it involves placing the welt in contact with the sole during the sole molding process. The welts of the invention are particularly well suited for the blow molding process, because the liquid sole composition can wick into the fabric before solidifying, ensuring a good bond with the shoe.

Figure 3:
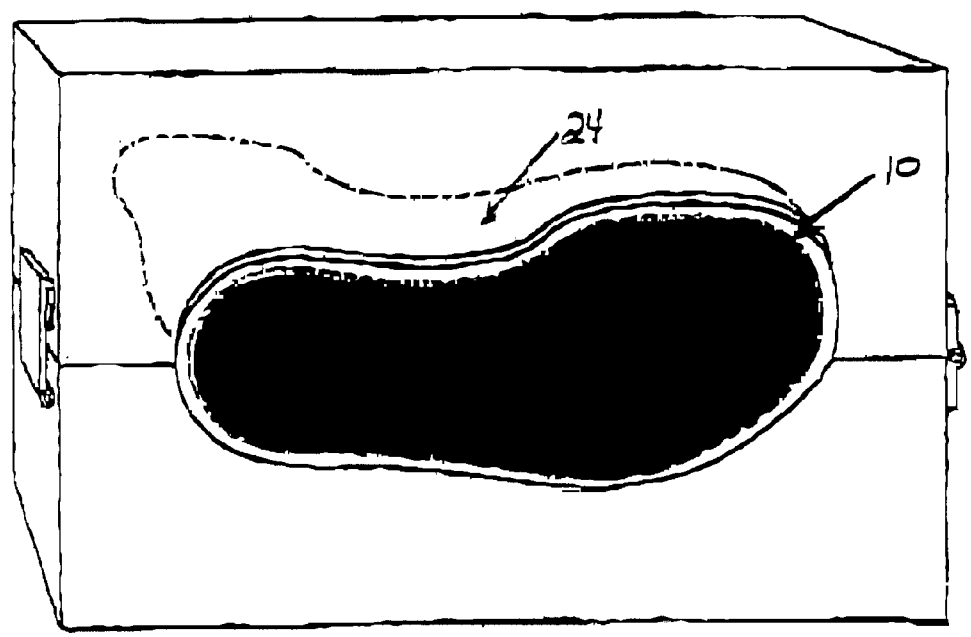
FIG. 3 illustrates a welt and upper clamped together to secure the upper for mounting to the sole portion of the mold.
Figure 4:
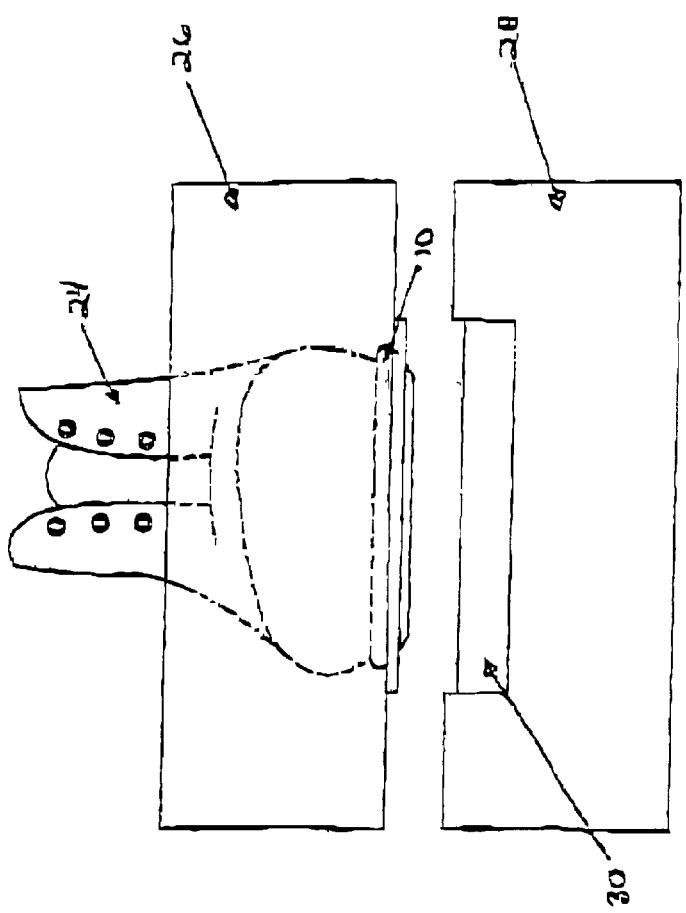
FIG. 4 illustrates the upper and lower mold used to form a blow molded sole.
Figure 5:
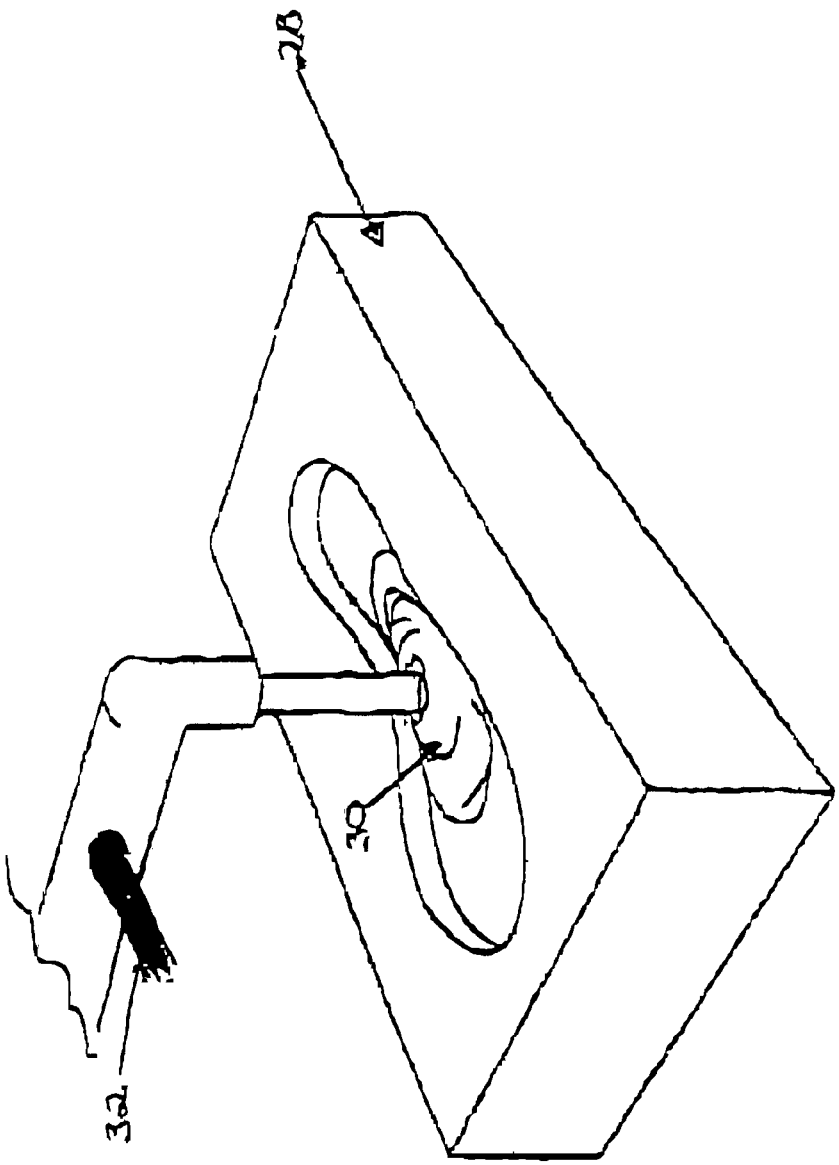
FIG. 5 illustrates fining the lower mold for blow molding.

FIGS. 4–5 illustrate the blow molding process as it applies to the invention. The welt 10 may be stitched to the upper 24, as shown in FIG. 3, before or after blow molding. Welt and upper are clamped in a shaped upper mold 26, as shown in FIG. 4. A shaped lower mold 28 is filled with a liquid sole precursor composition 30, as shown in FIG. 5, and the upper and lower mold are clamped together. Catalyst can be added via a feed tube 32 as the mold is filled. The liquid precursor 30 comes in contact with the fabric layer 20 of the welt, allowing the liquid to partially penetrate the fabric to form a strong bond. The precursor is then cured to form the molded sole.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of making shoes, comprising,
    providing a polymer welt having a layer of fabric bonded to a surface of the welt;
    attaching the welt to an upper of a shoe;
    providing a mold for a shoe sole;
    filling the mold with a liquid precursor of a sole composition;
    placing the attached welt and upper in contact with the mold;
    inducing thee liquid precursor to at least partially penetrate the fabric layer by subjecting the liquid precursor and the fabric layer to activating conditions, wherein said activating conditions include heat generated by the interaction of the liquid precursor and a catalyst added to the liquid precursor; and
    solidifying the liquid precursor to form a solid sole attached to the welt.

2. The method of claim 1, wherein the polymer welt comprises a material selected from the group consisting of poly(vinyl chloride), thermoplastic rubber, chlorinated polyethylene, and ethyl vinyl acetate.

3. The method of claim 1, wherein the fabric is a polyester stitchbond.

4. The method of claim 1, wherein the fabric is attached to the welt via a coextruded adhesive layer.

5. The method of claim 1, wherein the fabric is attached to the welt via a secondarily extruded layer.

6. The method of claim 1, wherein the welt is attached to the upper by stitching.

7. The method of claim 1, wherein the solid sole comprises polyurethane.

* * * * *